May 5, 1959     H. R. BILLETER     2,884,793
VARIABLE SPEED TRANSMISSION AND CONTROLS THEREFOR
Filed July 12, 1956     6 Sheets-Sheet 1

INVENTOR.
Henry Robert Billeter
BY
Attorneys

INVENTOR.
Henry Robert Billeter

May 5, 1959 H. R. BILLETER 2,884,793
VARIABLE SPEED TRANSMISSION AND CONTROLS THEREFOR
Filed July 12, 1956 6 Sheets-Sheet 3

INVENTOR.
Henry Robert Billeter
BY
Attorneys

May 5, 1959    H. R. BILLETER    2,884,793
VARIABLE SPEED TRANSMISSION AND CONTROLS THEREFOR
Filed July 12, 1956    6 Sheets-Sheet 4

INVENTOR.
Henry Robert Billeter
BY
Attorneys

May 5, 1959 H. R. BILLETER 2,884,793
VARIABLE SPEED TRANSMISSION AND CONTROLS THEREFOR
Filed July 12, 1956 6 Sheets-Sheet 5

INVENTOR.
Henry Robert Billeter
BY
Attorneys

United States Patent Office 2,884,793
Patented May 5, 1959

2,884,793

VARIABLE SPEED TRANSMISSION AND CONTROLS THEREFOR

Henry Robert Billeter, Deerfield, Ill., assignor to Liquid Controls Corporation, North Chicago, Ill., a corporation of Illinois Application July 12, 1956, Serial No. 597,444

9 Claims. (Cl. 74—112)

This invention relates to a variable speed transmission and controls therefor, and it is an object of the invention to provide improved apparatus of that character.

A transmission constructed in accordance with the present invention may be infinitely variable in its ratio of input speed to output speed. The controls for the transmission may permit intermittent adjustment of the speed ratio thereof by a force of very small value and may at all times prevent application of back-pressure by the transmission against the adjusting force.

Apparatus constructed in accordance with the present invention is particularly adapted to compensate a liquid volume flow measuring machine for volumetric changes resulting from temperature changes of the liquid, whereby the indications of volume flow are compensated to indicate that volume flow which would have occurred if the liquid had been at some standard temperature, and the invention is disclosed herein employed in such an application. It is to be understood, however, that the invention has other applications. The entire disclosed apparatus may, for example, be employed to compensate any fluid volume flow measuring machine for changes in various conditions other than temperature. Furthermore, various component parts of the apparatus disclosed herein, such as the variable speed transmission, may be employed in entirely different applications.

Accordingly, it is another object of the invention to provide an improved variable speed transmission whose ratio of input speed to output speed is infinitely variable between practical limits.

It is another object of the invention to provide an improved variable speed transmission whose speed ratio is adjustable by movement of its input and output shafts laterally toward and away from alignment with each other.

It is another object of the invention to provide improved control means for a variable speed transmission of the character described above which permits intermittent adjustment of the speed ratio of the speed transmission by a force of very small value.

It is another object of the invention to provide improved apparatus for compensating a liquid volume flow meter in accordance with changes in some external condition or conditions.

It is another object of the invention to provide improved control means and a variable speed transmission of the character defined above for compensating a liquid volume flow meter for the temperature of the liquid being metered.

This invention, together with further objects and advantages thereof, will best be understood by reference to the following description taken in connection with the accompanying drawings, and its scope will be pointed out in the appended claims.

In the drawings, in which like parts are designated by like reference numerals:

Figure 1:
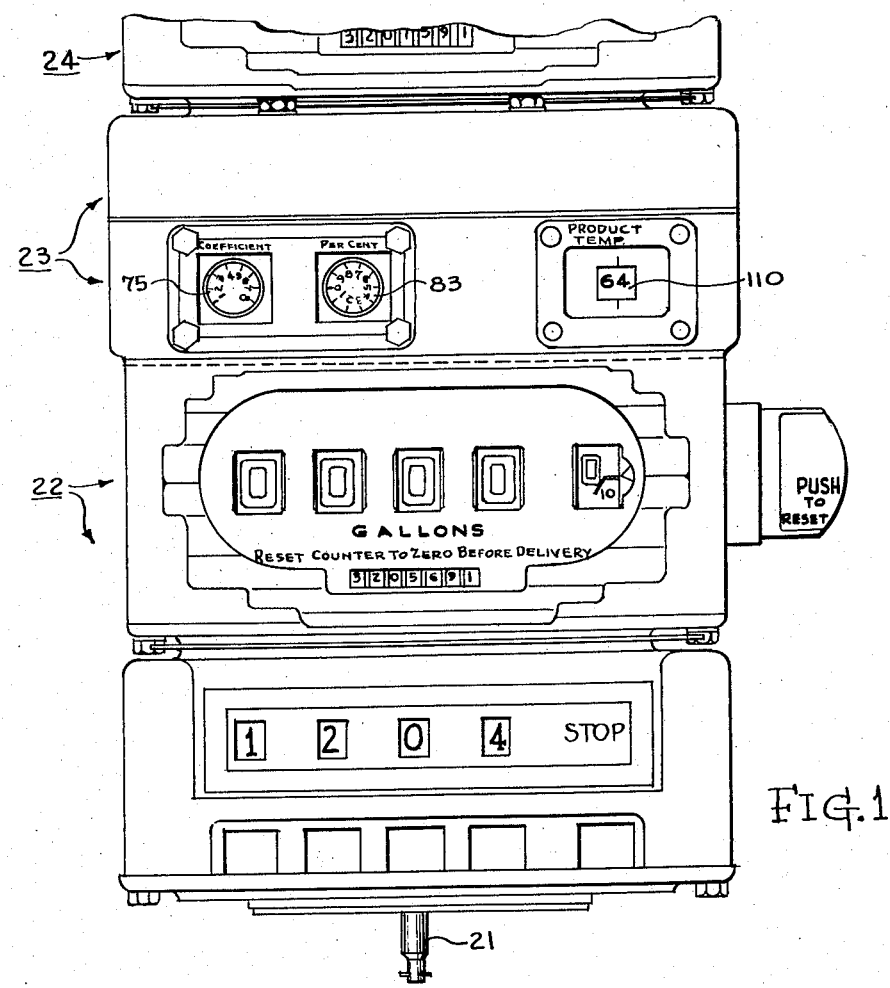
Figure 1 is an elevational view of a liquid volume flow metering machine incorporating apparatus constructed in accordance with one embodiment of the invention.
Figure 4:
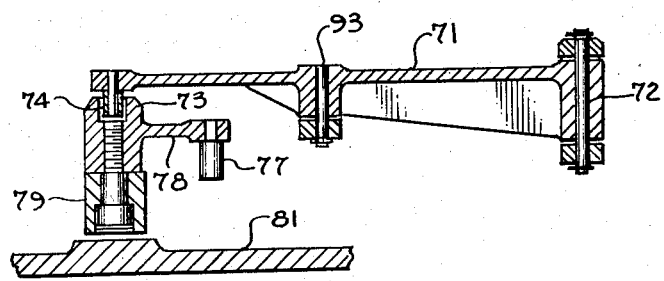
Fig. 4 is a cross-sectional view taken along the line 4—4 of Fig. 2.

As indicated above, the present invention is particularly applicable to a liquid volume flow metering machine such as is employed in metering the flow of petroleum or products thereof, and the invention is shown in the drawings and described herein as employed in such an application. It is to be understood, however, that the overall apparatus may be employed in various other applications, and that various components of the overall apparatus may likewise be employed in various applications.

*The overall, compensated liquid flow meter*

In Fig. 1 a drive shaft 21 may be seen extending from the bottom of the registering apparatus. This drive shaft may be connected to any suitable form of apparatus which is responsive to volume flow of liquid. The shaft drives conventional registering apparatus 22 such that it may indicate the volume flow of liquid in response to rotation of the shaft 21. Immediately above the registering apparatus 22 there is located temperature compensating apparatus 23 embodying the present invention. As is further developed herein, the compensating apparatus 23 may be employed to compensate for conditions other than, or in addition to, temperature. Located above the compensating apparatus 23 and shown in part in Fig. 1 is a second register 24 which is driven by the shaft 21 through the compensating apparatus 23 such that the second register records volume flow compensated for the temperature of the metered liquid. More specifically, the register 22 shows the actual volume flow, whereas the register 24 shows that volume flow which would have occurred if the liquid had been at some standard temperature. The information provided by the register 24 makes it possible to avoid an excessive supply of liquid or an undercharge therefor which would otherwise result when the liquid is substantially colder than some standard temperature. Similarly, it makes it possible to avoid a short supply or overcharge which would otherwise result when the liquid is substantially warmer than the standard temperature. It will readily be seen that in order for the register 24 to indicate volume flow compensated for temperature of the liquid, it is necessary that it be driven at a speed greater or less than register 22, and hence that a suitable drive shaft (not seen in Fig. 1) be driven at a variable speed with respect to the speed of the drive shaft 21, all in accordance with the temperature of the liquid and its coefficient of expansion. One embodiment of apparatus for effecting this variation in speed in accordance with the temperature of the liquid is shown in Figs. 2–8.

Figure 3:
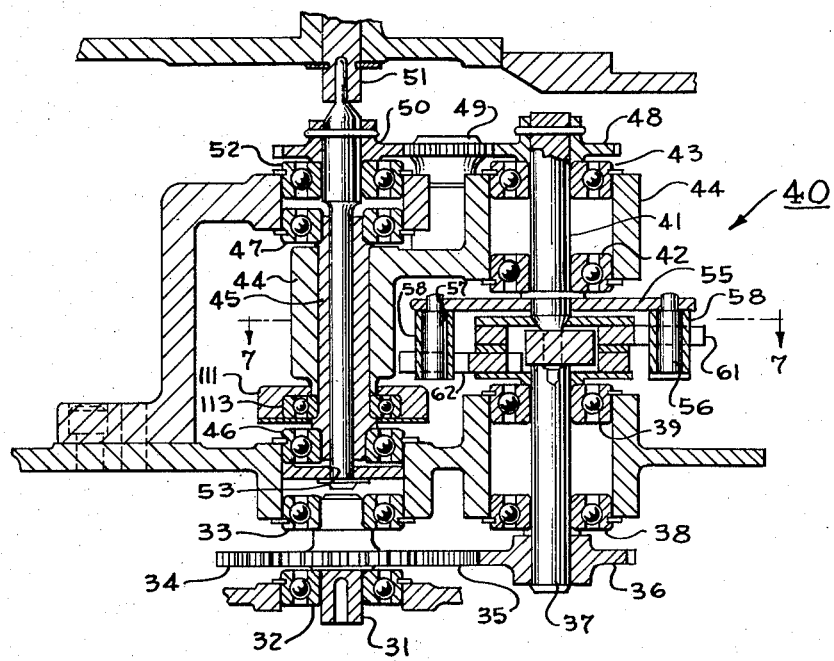
Fig. 3 is a cross-sectional view taken along the line 3—3 of Fig. 2.
Figure 7:
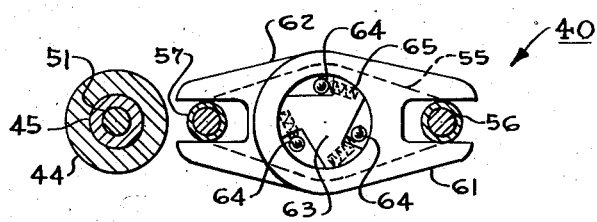
Fig. 7 is a cross-sectional view taken along the line 7—7 of Fig. 3.
Figure 5:
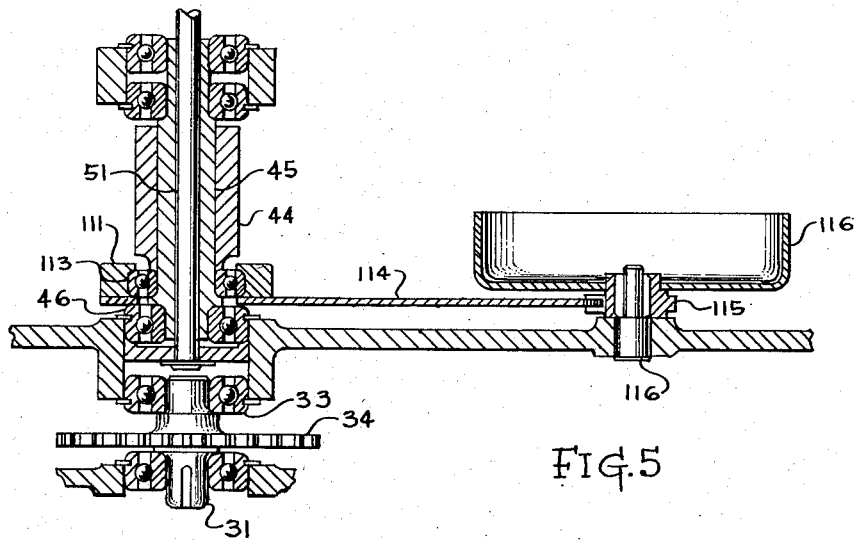
Fig. 5 is a cross-sectional view taken along the line 5—5 of Fig. 2.

Referring first to Figure 3, a shaft 31 is shown which may be driven by the shaft 21, the speed of the shaft 31 being the same as that of the shaft 21 or a fixed multiple thereof. The shaft 31 is rotatably mounted in suitable bearings 32 and 33, and has a single gear 34 secured thereto. The gear 34 operates through an idler gear 35 to drive a third gear 36, this gear being secured to and driving a shaft 37. The shaft 37 is rotatably mounted in suitable bearings 38 and 39 and forms a part of a variable speed transmission 40 through which it drives a shaft 41, approximately coaxial therewith. The shaft 41 is mounted in suitable bearings 42 and 43 which are in turn mounted in an arm 44. This arm is arranged on a rotatable sleeve 45 which is mounted in suitable bearings 46 and 47. The purpose of providing pivotal movement of the arm 44 is explained below in connection with the detailed description of the variable speed transmission 40.

A gear 48 is secured to the shaft 41 and, through an idler gear 49, drives a gear 50 which preferably has the same number of teeth as the gear 48. The gear 50 is secured to and drives a shaft 51 which, in turn, drives the compensated register 24 of Fig. 1. The shaft 51 is rotatably mounted in suitable bearings 52 and 53 and extends through the sleeve 45 without contacting the latter, such that rotation of the shaft 51 may not induce any rotation or torque in the sleeve.

It will now be seen that the shaft 51 is driven by the shaft 21 through the shaft 31, the gears 34, 35 and 36, the variable speed transmission 40, and the gears 48, 49 and 50. It will be seen that as the variable speed transmission 40 is altered to vary the speed ratio of the power input shaft 37 and the power output shaft 41, the shaft 51 will rotate at varying speeds with respect to the shaft 31. Temperature responsive apparatus described below is employed to alter the variable speed transmission 40 whereby, with a given speed of the shaft 31, the shaft 51 may be made to rotate faster when the liquid being pumped is below a standard temperature, and to rotate more slowly when the liquid is above the standard temperature.

*Variable speed transmission construction*

In accordance with the embodiment of the invention shown in Figs. 2–8 the driven portion of the variable speed transmission includes an arm 55 which is secured to the shaft 41. Mounted on the arm 55 is a pair of pins 56 and 57 preferably having sleeves 58 thereon in order to reduce friction. As may be seen best in Fig. 7, the pins 56 and 57 are spaced away from the shaft 41 and are arranged at diametrically opposite sides thereof.

The driving portion of the transmission 40 includes a pair of arms 61 and 62 each having a yoke for receiving a pin 56 or 57 and having a hub portion concentric about the shaft 37. Arranged within the hub portions of the arms 61 and 62 is a clutch body 63 which is secured to or integral with the shaft 37. Three rollers 64 are arranged in the wedge-shaped spaces formed between the clutch body 63 and the arm 61, and a like number of springs 65 lie within recesses in the clutch body and urge the respective rollers 64 in a counterclockwise direction as viewed in Fig. 7, or toward the narrow ends of the wedge-shaped spaces.

It will now be seen that any relative clockwise movement of the clutch body with respect to the arm 61 causes the rollers 64 to wedge between arm and the clutch body such that the arm is caused to rotate with the shaft 37. However, if the arm 61 tends to move in a clockwise direction with respect to the clutch body, the rollers 64 are encouraged to roll in a clockwise direction against the action of the springs 65, with the result that the arm 61 is no longer locked against rotation with respect to the clutch body 63 and the shaft 37. The arm may therefore move in a clockwise direction with respect to the clutch body.

Similar sets of rollers 64 and springs 65 are provided for cooperating with the arm 62 whereby both arms are restrained from rotating in a counterclockwise direction with respect to shaft 37, but may freely rotate in a clockwise direction with respect to the shaft. A one-way clutch mechanism is thereby provided through which the shaft 37 may drive the arms 61 and 62, and hence the pins 56 and 57 and the shaft 41, in a clockwise direction as viewed in Fig. 7, but which permits either of the arms 61 or 62 to advance ahead of the shaft 37 in a clockwise direction.

With the shaft 41 and the shaft 37 in exact coaxial orientation, and with shaft 37 driving in a clockwise direction, all parts of the transmission, including the two shafts, rotate in unison, there being a 1:1 speed ratio. However, when the arm 44, which carries the shaft 41, pivots to carry the shaft 41 out of coaxial orientation with respect to the shaft 37, the shaft 41 is driven at a higher rate of speed than the driving shaft 37, all as may readily be explained with reference to Fig. 8.

Figure 8:
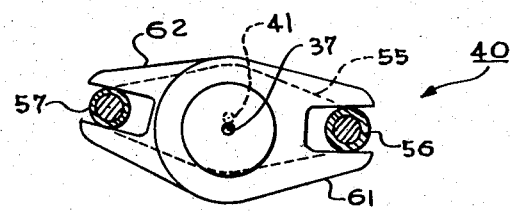
Fig. 8 is a view similar to Fig. 7 but showing the apparatus in a different operating position.

Starting from the position shown in Fig. 8, it will be seen that as the arm 62 is driven in a clockwise direction by the shaft 37, it may carry the pin 57 from the position shown through an angle of 180 degrees to the illustrated position of the pin 56, while the arm itself travels through a lesser angle. Accordingly, the shaft 41 is driven through 180 degrees while the shaft 37 travels through a lesser angle, with the net result that the average speed of the shaft 41 is greater than that of the shaft 37. During this time the pin 56 necessarily travels from its original position through 180 degrees to the illustrated position of the pin 57. Since the arm 61 meshes with the pin 56, it will be carried from its original position to the illustrated position of the arm 62, and accordingly will travel through an angle greater than 180 degrees. The arm 61 therefore advances ahead of the shaft 37, this being permitted by the one-way clutch mechanism previously described.

When the entire variable speed transmission 40 has thus reversed itself, the arm 61 and the pin 56 will carry the torque, the arm 61 driving the pin 56 through an angle of 180 degrees while it travels through a lesser angle, and the pin 57 carrying the arm 62 through an angle greater than 180 degrees. During this half cycle, the arm 62 advances ahead of the shaft 37 as permitted by the one-way clutch mechanism.

If the shaft 41 were displaced from the shaft 37 to such an extent that the angle formed by the pin 57, the shaft 37, and the pin 56 in the position illustrated in Fig. 8 were 175 degrees, it will be apparent that the speed ratio of the two shafts 41 and 37 would be equal to 180:175. If the two shafts are displaced by a greater distance such that the referred-to angle were 170 degrees, the ratio would become 180:170. Accordingly, as the displacement of the two shafts with respect to each other increases, the speed ratio of the two shafts increases. Such displacement of the two shafts is produced by pivotal movement of the arm 44, and this in turn is controlled by a temperature sensitive device and certain control means as is described below.

*Control apparatus for transmission*

Figure 2:
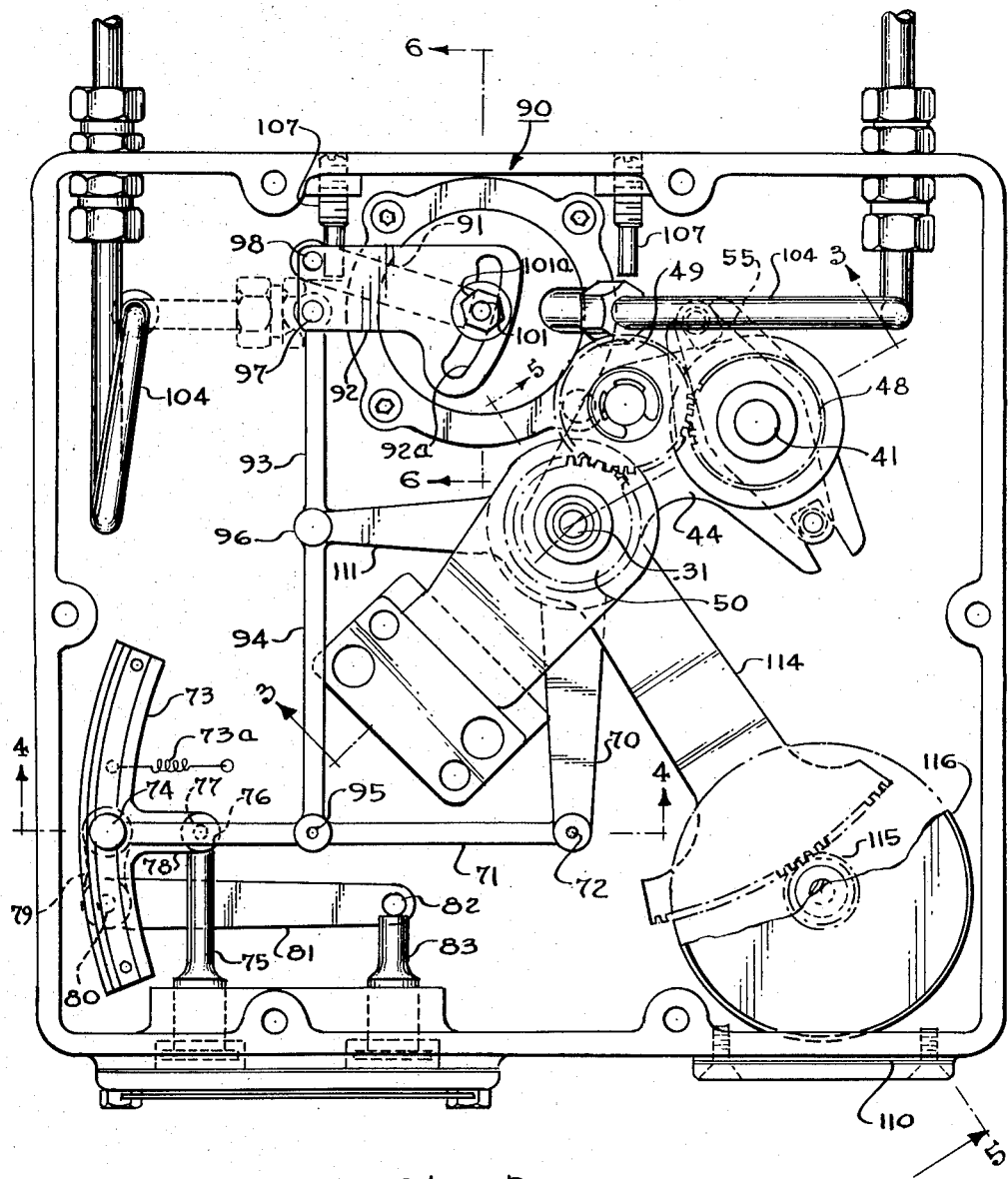
Fig. 2 is a plan view of temperature compensating apparatus incorporated in the machine of Fig. 1.

As may be seen best in Fig. 2, the arm 44 continues beyond the coaxial shafts 31 and 51 to form a bell crank having an arm portion 70. A link 71 is pivotally connected at its right-hand end to the arm portion 70 through a pin 72. Adjacent the left-hand end of the link 71 is an arcuate cam track 73, and mounted on the left-hand end of the link 71 is a suitable cam follower 74 which rides in the cam track 73. The cam follower 74 is free to move along the cam track 73, but is restrained from lateral movement with respect thereto.

The cam track 73 is preferably so shaped that when it is symmetrically arranged it is arcuate about the pin 72, whereby movement of the cam follower 74 along the cam track 73 in either direction produces no movement of the arm portion 70. However, it will be seen that if the cam track 73 is tilted, for example in a counter-clockwise direction, movement of the cam follower 74 upwardly along the cam track 73 will pull the link 71 to the left, with the result that the arm portion 70 pivots to the left and the arm 44 pivots downwardly to displace the shaft 41 with respect to the shaft 37.

Such tilting of the cam track 73 is accomplished through an adjusting member 75. This member may be threaded into the housing such that manual turning causes it to move inwardly or outwardly to tilt the cam track 73. It will be seen that the inner end of the adjusting member 75 is in the form of a flat surface 76 against which a roller 77 bears, this roller being secured to an arm 78 which is in turn secured to or integral with the cam track 73.

The cam track is pivotally mounted near its center point on an arm 79 which is pivotable about a pin 80. The arm 79 is integral with an arm 81 which has a roller 82 at its right-hand end, this roller bearing against a second adjusting device 83 which is also movable inwardly and outwardly by virtue of threaded engagement with the housing. As the adjusting device 83 is moved inwardly or outwardly, the arm 79—81 pivots about the pin 80 and carries the cam track 73 bodily to the left or to the right. This adjustment controls the basic setting of the apparatus, such that the two registers 22 and 24 will read the same flow when the adjusting device 75 is set for zero temperature coefficient. When the adjusting device 75 is set for zero temperature coefficient the arcuate cam track 73 is centered about the pin 72 whereby movement of the link 71 by the temperature responsive unit 90 does not affect the transmission 40. The adjusting device 83 will then be properly set when it is so adjusted as to produce equal recording rates in the two meters 22 and 24.

The adjusting members 75 and 83 have indicia on their outer ends to indicate settings thereof. As may be seen in Fig. 1, the member 75 is graduated in terms of temperature coefficient of expansion of the liquid being pumped and metered, while the member 83 is calibrated in percent.

The temperature responsive unit

The required movement of the link 71 is effected by a temperature responsive unit 90 (see Fig. 2) acting through an arm 91, an adjusting member 92 and a pair of links 93 and 94. The link 94 is pivotally connected to the link 71 through a pin 95 and pivotally connected to the link 93 through a pin 96. The adjusting member 92 is pivotally connected to the link 93 and to the arm 91 through pins 97 and 98 respectively. Another arm or link 111, further described below, completes a parallelogram linkage along with the arm portion 70, the link 94 and the right-hand portion of the link 71, with the result that the angular relationship between the links 71 and 94 follows a definite pattern or function.

Figure 6:
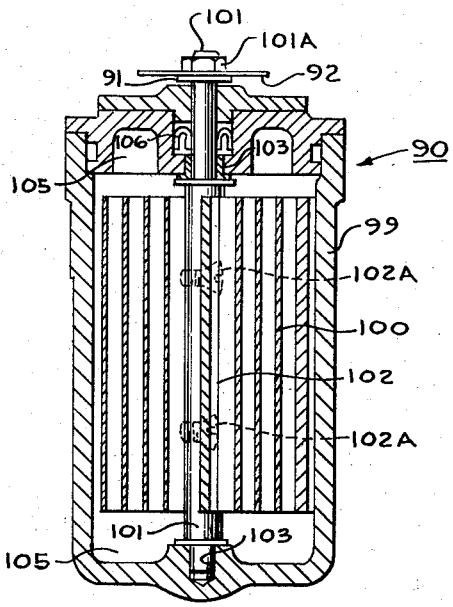
Fig. 6 is a cross-sectional view taken along the line 6—6 of Fig. 2.

The temperature responsive unit 90 is shown in greater detail in Fig. 6. A housing 99 is provided, and arranged therein is a spirally wound bimetal element 100 which is secured at its outer end to the housing, by any suitable means, and at its inner end to a shaft 101 by a strip 102 and a pair of screws 102a. The shaft 101 is rotatably mounted in suitable bearings 103 in the housing 99.

Pipes 104 may be seen in Fig. 2 to connect to the temperature responsive unit 90. These pipes carry a portion of the metered liquid to and from this unit. As may be seen in Fig. 6, the housing 99 includes a pair of ports or chambers 105 which connect with the pipes 104. Liquid entering one of these ports tends to flow through the bimetal element 100 to the other port. It will be understood that the amount of liquid flowing through the temperature responsive unit 90 is not critical, it being necessary only that there be a sufficient flow to produce rapid response to temperature changes in the liquid as metered.

The shaft 101 extends through suitable packing 106 and out through the walls of the housing 99 where it is secured to the arm 91. It will now be seen that as the bimetal element 100 expands or contracts with a temperature change of the liquid as metered, the shaft 101 will be turned accordingly and will cause pivotal movement of the arm 91.

Referring again to Fig. 2, it may be seen that the adjusting member 92 has a slot 92a which is arcuate about the pin 98 and which receives the shaft 101. With the adjusting member in any given position it may be considered that the arm 91 causes pivotal movement of the adjusting member in response to a temperature change and that the adjusting member raises or lowers the links 93 and 94. However, upon loosening of a nut 101a on the shaft 101, the member 92 may be pivoted about the pin 98, the slot 92a sliding over the shaft 101. This swings the pin 97 to the left or right in Fig. 2, to increase or decrease the effective length of the lever arm through which the temperature responsive unit acts on the linkage. This, in turn, alters the response of the linkage to expansion and contraction of the temperature responsive unit. In this manner the apparatus may be brought into proper adjustment for the sensitivity of the bimetal element.

While the member 92 permits adjustment of the control apparatus to adapt it to the rate of response of the bimetal element, a separate adjustment is provided to adjust the system to the absolute setting of the bimetal element. Set screws 107, threadedly engaging the casing of the machine and engaging suitable lugs on the housing of the bimetal element, are provided for adjustable positioning of the bimetal element. Accordingly, provision is made for adjusting for both the absolute setting of the bimetal element and its sensitivity.

Temperature indicator

Referring to Figure 1, a window 110 may be seen through which may be read an indication of the liquid temperature for which the apparatus is compensating the register 24. This may be compared with a separate temperature measurement to determine whether the apparatus is functioning properly. The indicator is controlled by the temperature responsive unit 90 acting through the link 93. As seen in Figure 2, the arm 111, previously referred to, is pivotally connected to the link 93 through the pin 96, the arm 111 being itself pivotally mounted on the sleeve 45 (see Figs. 3 and 5) through suitable bearings 113. Integral with or secured to the arm 111, and forming a continuation thereof, is an arm 114 seen in Figs. 2 and 5. The arm 114 carries an arcuate rack, or gear segment, at the end thereof which engages a gear 115 rotatably mounted on a shaft 116. Secured to the gear 115 is a suitable drum 116 having temperature indicating numerals on the cylindrical surface thereof, this drum being located immediately behind the window 110 such that the numerals thereon may be read through the window. It will readily be seen that as the temperature responsive unit 90 raises and lowers the link 93 in response to changes in temperature of the gasoline as metered, the arms 111 and 114 will pivot and rotate the gear 115 and hence the temperature indicating drum 116. The drum should be calibrated originally to indicate standard temperature when the link 71 is coincident with the pivotal axis of the cam track 73.

*Operating characteristics of transmission and controls*

In order for the temperature responsive unit 90 to control the variable speed transmission 40 accurately and sensitively, it is essential that it be permitted to adjust the control mechanism when no forces are operating against the applied force of the temperature responsive unit. If any appreciable force is present which counteracts the force of the temperature responsive unit, the desired actuation of the control members will be effected only after there has been a sufficient change in temperature that the temperature responsive unit may exert a sufficient force to overcome the counteracting force. In such case there is an inevitable error in the adjustment.

Control apparatus constructed in accordance with the disclosed embodiment of the invention provides frequently recurring instants during which no significant force is present to counteract the force of the temperature responsive unit 90. Furthermore during the periods of time intermediate such instants, the control apparatus exerts no forces against the temperature responsive unit since the train of force transmitting elements is irreversible.

In this respect it should be noted first that when the transmission of torque by the variable speed transmission 40 results in the application of a torque on the arm 44, this torque is transmitted through the arm 70 to the link 71 wherein it appears as a longitudinal force along the length of the link. This longitudinal force causes the cam follower 74 to bear against one side or the other of the cam track 73. This restrains the link 71 from longitudinal movement, which in turn prevents pivotal movement of the arm 44 in response to the torque applied thereto by the variable speed transmission 40. As a practical matter the cam track 73 need be tilted by the adjusting device 75 through only a small angle in order to obtain the desired control of the variable speed transmission by the temperature responsive unit 90. Accordingly the surface of the cam track 73 against which the cam follower 74 bears need deviate by only a small angle from perpendicularity to the line of force acting between the cam follower and the cam track. In practice this deviation from perpendicularity may be sufficiently small that even with a low coefficient of friction between the cam follower and cam track the cam follower is locked against movement along the cam track in response to force transmitted along the link 71. Accordingly torque applied to the arm 44 by the variable speed transmission 40 and acting through the link 71 will not cause movement of the cam follower along the cam track and hence transmits no force to the temperature responsive unit 90 through the link 94. The force acting between the cam follower and the cam track remains nearly perpendicular to the cam track even though the link 71 pivots through a large angle since the cam track is arcuate substantially to match the movement of cam follower about the pin 72.

In addition, the torque applied to the arm 44 by the variable speed transmission, and hence the force transmitted by the link 71, passes through zero at frequently recurring intervals as will now be explained in detail. Referring to Figure 8, it will be seen that as the drive shaft 37 rotates in a clockwise direction, torque is applied to the driven element 55 and the driven shaft 41 only through the arm 62 and the associated pin 57, the pin 56 moving the arm 61 freely ahead of the drive shaft 37. Accordingly, with the variable speed transmission in the position illustrated in Figure 8 the arm 62 exerts an upward force (as viewed in Figure 8) against the pin 57, the driven element 55, the driven shaft 41 and hence the arm 44. This produces a counterclockwise torque in the arm 44 and in turn creates tension in the link 71. The counterclockwise torque is at a maximum at this instant and is graphically represented in Figure 11 at 0° displacement.

Figure 11:
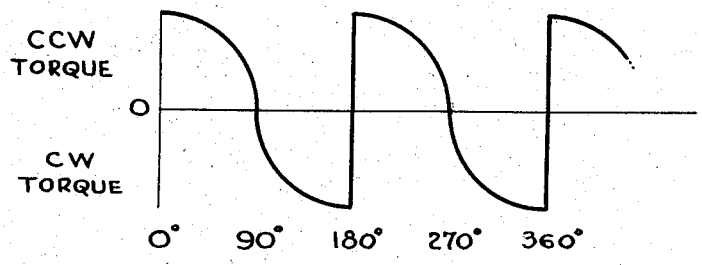
Fig. 11 is a diagram illustrating certain forces plotted against angular position, characteristic of the apparatus of Fig. 8.

As the arm 62 drives the pin 57 through an angle of 90°, it reaches the point at which the force applied to the pin is horizontal. This force is then substantially directly away from the pivotal axis of the arm 44 with the result that no torque is applied to the lever. This point of zero torque is represented in Figure 11 at 90° displacement. As the arm 62 continues to rotate through the next 90°, the force applied to the pin has an ever increasing downward component (as viewed in Figure 8) with the result that increasing clockwise torque is applied to the arm 44, this torque reaching a maximum when the pin 57 has been rotated through an angle of 180° from its original position illustrated in Figure 8. The maximum clockwise torque applied to the arm 44 is represented in Figure 11 at 180° displacement. At this time the link 71 is urged to the left whereby the cam follower 74 bears against the lefthand wall of the cam track 73.

At this point in the rotation of the variable speed transmission 40, the arm 61, which is now in the illustrated position of the arm 62 in Figure 8, assumes the load. Accordingly the force applied to the driven member 55 by the driving shaft 37 is suddenly changed from a downward force applied by the arm 62 to an upward force applied by the arm 61. This is also indicated in Figure 11 at 180° displacement. It will be apparent that the second half of this cycle will be a repetition of the first half.

It will now be seen that the torque applied to the arm 44 by the variable speed transmission, and hence the force applied to the link 71, passes through zero after each 90° of rotation. When the force on the link 71 passes through zero the cam follower 74 is for an instant floating freely within the cam track 73, and during these frequently recurring instants the cam follower 74 may readily be moved along the cam track by the temperature responsive unit 90 acting through the link 92. Furthermore, during the intervening periods, when torque is applied to the lever 44 and force is applied to the link 71, any tendency of the link 71 to slide the cam follower along the cam track is resisted by the coefficient of friction therebetween in cooperation with the very steep angle of the applied force, to the effect that there is no resulting force applied to the link 94 or the temperature responsive unit by the link 91.

Attention is directed to the fact that only those forces of varying direction applied to the pins 56 and 57 by the arms 61 and 62 are effective in applying torque to the arm 44. More particularly the torque transmitted from the gear 48 on the driven shaft 41 of the variable speed transmission to the gear 50 through the idler gear 49 produces no torque in the arm 44. This holds true even if the gear 50 were to drive a substantial load rather than an easily driven register. This results from the fact that the gear 48 and the gear 50 are alike and a single idler gear (or any odd number of idler gears) is arranged intermediate the gears 48 and 50 and mounted on the arm 44. Since this fact will readily be recognized by those skilled in the art and since a formal proof thereof would necessarily be quite elaborate, no such formal proof is offered herein. However, this fact may be demonstrated indirectly by a simple analysis.

Let it be assumed that the gear 50 is locked against rotation with respect to the housing by an infinite load. If the arm 44 is now pivoted about its axis it will be apparent that while the gear 48 will rotate with respect to the arm 44, there will be no rotation of this gear with respect to the base of housing of the apparatus. In other words, if the arm 44 could be rotated through 360° with the gear 50 remaining stationary, the gear 48 would be carried around the axis of rotation of the arm 44 with no rotation thereof with respect to the housing, that tooth of the gear 48 which is uppermost in Figure 2 remaining uppermost through the entire cycle of rotation. If pivotal movement of the arm 44 does not permit rotation of the gear 48, a balanced torque applied to the gear 48 will not induce pivotal movement of the arm 44.

Since no torque is applied to the arm 44 by interaction of the gears 48, 49 and 50, the only torque applied to the lever is that resulting from the unbalanced forces alternately applied to the pins 56 and 57 by the arms 61 and 62.

It will be apparent upon analysis of Figure 8 that whether the shaft 41 is moved above or below the shaft 37, the shaft 41 will be driven faster than the shaft 37. More particularly, the range of speeds of the driven shaft 41 extends from a speed equal to that of the shaft 37 to a speed substantially in excess thereof. Accordingly if it is desired, as in the present instance, that the shaft 51 be arranged to rotate either faster or slower than the shaft 31, reduction gearing must be employed such that when the transmission 40 is operating at a speed ratio of 1:1 the shaft 51 will rotate more slowly than the shaft 31.

Such speed reduction gearing is provided in the gear train 34—35—36, the gear 36 having more teeth than the gear 34. In the preferred embodiment of the invention illustrated in the drawings the gear 36 and hence the shaft 37 rotate at a speed 5% slower than the shaft 31 and the gear 34. Accordingly the minimum speed of the shaft 51 is 5% slower than the shaft 31, this being sufficient to compensate for maximum temperatures of gasoline and other petroleum products normally encountered in practice. By controlling the variable speed transmission 40, the speed of the shaft 51 may be raised from this value to one considerably in excess of the speed of the shaft 31 to compensate for liquid at the lowest temperates encountered in practice. Attention is directed to the fact that such speed reduction should not be accomplished through the use of dissimilar gears in place of the like gears 48 and 50. Any difference in the number of teeth in the gears 48 and 50 will result in a torque being applied to the arm 44 by virtue of the torque transmitted by the transmission 40 aside from the torque on the arm resulting from the unbalanced forces applied to the arm by the arms 61 and 62. This would cause vertical displacement of the torque pattern represented in Figure 11. Depending upon various parameters the torque curve might fall entirely above or below the zero torque line with the result that the net torque applied to the arm 44 might never pass through zero. This would mean that the temperature responsive unit 90 must move the link 71 even though substantial frictional forces between the cam follower 74 and the cam track 30 were resisting such movement.

It is desirable furthermore that the torque curve represented in Figure 11 be symmetrical about the torque axis. It is true that the coefficient of friction of the cam follower 74 and the cam track 73 in combination with the angle of the force applied by the link 71 in response to the torque applied to the arm 44 may readily be made to produce non-reversibility, all as explained above. However, where the apparatus is subject to slight vibration, the cam follower 74 may tend to creep along the cam track 73 as a result of torque applied to the arm 44 and the resultant force on the link 71. If the torque curve is centered above the zero torque axis as shown in Figure 11, and as will be the case in the preferred embodiment of the invention, any such tendency of the cam follower 74 to creep along the cam track 73 will be balanced during each half cycle of the variable speed transmission 40.

Accordingly it is preferred that the gear 48 which is mounted on the arm 44 have the same number of teeth as the gear 50 which is centered on the pivotal axis of the arm 44 and be geared to the gear 48 through an odd number of idler gears mounted on the arm. It will of course be recognized that the speed reduction resulting from the dissimilar gears 34 and 36 may be obtained entirely outside the temperature compensating apparatus, the speed reducing gears or equivalent apparatus being made to reduce the speed of the shaft 37 with respect to the drive shaft 21 or to reduce the speed of the compensated register 24 with respect to the shaft 51.

*Operation*

The preferred embodiment of the invention now having been described in detail, a full understanding of the invention may best be given by a description of a complete operation of the apparatus. Let it be assumed that liquid is to be pumped and metered, the liquid having some known coefficient of thermal expansion. The adjusting element 75 is first set in accordance with the known coefficient of expansion of the particular liquid to be pumped and metered. This tilts the cam track 73 to the correct angle or orientation. It will be apparent that if the coefficient of expansion of the particular liquid being handled were small, the cam track 73 would be adjusted to nearly symmetrical orientation wherein it is nearly arcuate about the pin 72. Conversely, if the temperature coefficient of the liquid being handled is relatively great, the cam track 73 should be tilted through a substantial angle whereby it is arcuate about a point substantially above the pin 72. Under the latter condition a given vertical movement of the link 94 by the temperature responsive unit 90 would cause a larger longitudinal displacement of the link 72 than would be the case under the former condition.

Let it be further assumed temporarily that the adjusting device 83 is properly set, that when pumping of the liquid starts, the liquid which first passes through the temperature responsive unit 90 by way of the pipes 104 is at a temperature greater than the temperature which is taken as standard, for example, 60° F., and that the control linkage is at the moment in the position of Figure 2. As the drive shaft 21 begins to turn, it drives the standard register 22 in accordance with the actual volume of liquid being pumped. The drive shaft 31 is driven at the same speed or at some fixed multiple thereof, the shaft 37 is driven at a speed 5% less than the speed of the shaft 31, and the arm 44 is at such an angle that the speed ratio of the variable speed transmission causes the shaft 41 and the shaft 51 to rotate at the same speed as the shaft 31. The effect of the variable speed transmission is thereby to counteract the speed reduction caused by the gears 34 and 36 whereby the shaft 51 rotates at the same speed as the shaft 31 and whereby the compensated register 24 will record the same flow as the standard register 22.

However, as soon as the torque applied to the arm 44 passes through zero, the temperature responsive unit 90, in response to the liquid flowing therethrough lowers the links 93 and 94 and pivots the link 71 downwardly as the cam follower 74 moves downwardly along the cam track 73. This moves the arm 44 in a counterclockwise direction whereby the shaft 41 is moved closer to alignment with the shaft 37. This results in a lesser speed ratio between the input and the output of the variable speed transmission 40. Accordingly the shaft 51 will now rotate at a lower speed than the shaft 31 such that the compensated register 24 will read lesser amounts than the standard register 22.

Let it be assumed now that the liquid being pumped turns colder than the standard 60° F. temperature. The temperature responsive unit 90 now tends to raise the link 92, and during an instant when the torque on the arm 44 passes through zero, and hence the lateral force on the cam follower 74 is zero, the links 93 and 94 are free to raise the link 71 above the position illustrated in Figure 2. Such pivotal motion is accompanied by longitudinal movement of the link 71 to the left since the cam track 73 is tilted in a counterclockwise direction with respect to its illustrated position. This in turn pivots the arm 44 in a clockwise direction beyond its original position whereby the shafts 41 and 37 of the variable speed transmission are further displaced from each other. The speed ratio of the transmission is thereby increased such that the shaft 51 is driven at a greater speed than the shaft 31 and the compensated register 24 will register faster than the standard register 22.

In the event that the temperature of the liquid should change rapidly, it may be that any one instant of zero force between the cam follower 74 and the cam track 73 may be of insufficient duration to permit movement of the link 71 by the temperature responsive unit 90 to its fully corrected position. However, it will be noted by reference to Figure 11 that there are four such zero torque instants during each complete revolution of the variable speed transmission. Accordingly the link 71 may be moved quickly, even though in a series of steps, to its proper setting under the influence of the temperature responsive unit.

The basic adjustment of the apparatus by the adjusting device 83 is preferably accomplished while the adjusting device 75 is set for zero temperature coefficient. In such case the standard register 22 and compensated register 24 should read the same values. As indicated above, adjustment of the control element 83 causes movement of the cam track 73 bodily to the left or right such that the two meters 22 and 24 will record at the same rate when the adjusting device 75 is set for zero temperature coefficient of expansion.

Figure 12:
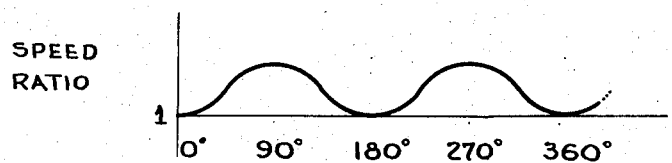
Fig. 12 is a diagram of speed ratio of driven and driving elements of the apparatus of Fig. 8.

Referring again to the variable speed transmission 40 and to Figure 8, it will be seen that each half cycle is a repetition of the previous half cycle. Analysis of Figure 8 reveals that the speed of the driven element 55 is nearly equal to the speed of the driving element when the pins 56 and 57 are in the positions illustrated in Figure 8. This follows from the fact that the pin 57 is approximately equidistant from the shaft 41 and the shaft 37. When the pin 57 reaches its uppermost point as viewed in Figure 8 it will travel at its highest speed and will again approach the speed of the driving element when it moves toward the illustrated position of the pin 56 all as shown in the diagram of Figure 12. Accordingly there is a gradual acceleration of the driven member 55 from a minimum speed to a maximum speed and a deceleration to its minimum speed during each half revolution thereof. This is believed to represent a substantial advancement in the art.

*Alternative transmission construction*

Figure 9:
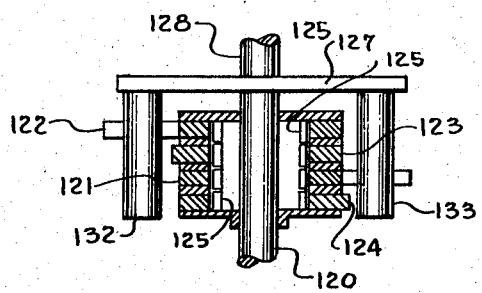
Fig. 9 is a partial cross-sectional view taken in the plane of Fig. 3 and illustrating an alternative embodiment of the apparatus shown in Figs. 7 and 8.
Figure 10:
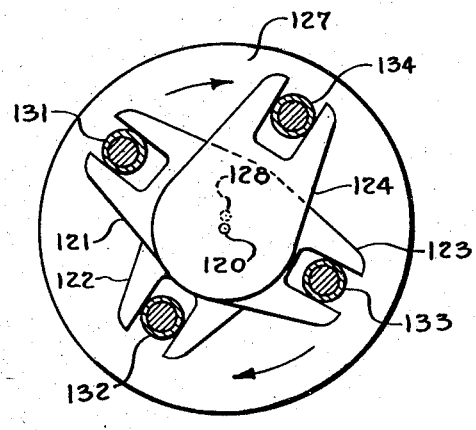
Fig. 10 is a view similar to Fig. 8 of the alternative embodiment illustrated in Fig. 9.

A further smoothing out of the speed of the driven member may be accomplished by an alternative embodiment of the invention illustrated in Figures 9 and 10. The apparatus illustrated in these two figures may be identical to that seen in Figures 3, 7 and 8 with the exception that it includes four arms, four pins and four one-way clutch mechanisms. In Figures 9 and 10 there may be seen four arms, 121, 122, 123 and 124, and four sets of rollers 125. A disk-like member 127 is supported on a driven shaft 128 and in turn supports four pins 131, 132, 133, 134. In view of the explanation of the construction and operation of the preferred embodiment of the transmission shown in Figures 3, 7 and 8, it will be apparent that with the arms 121–124 rotating in a clockwise direction as indicated by the arrow in Figure 10, the arm 121 will drive the pin 131 through an angle of 90° to the illustrated position of the pin 134. During this time the arms 122, 123, 124 will be driven ahead of the shaft 120 as a result of their engagement with the pins 132, 133, 134 respectively and as permitted by the respective one-way clutches. When the arm 121 has reached the illustrated position of the arm 124, the arm 122 will have reached the illustrated position of the arm 121 and will drive the pin 132 through an angle of 90°. Each successive arm thereby drives its associated pin through an angle of approximately 90° during each complete revolution of the apparatus and is in turn driven a net angle ahead of the shaft 120 during the remaining 270° of rotation.

It will be apparent that with four arms and four associated pins the instantaneous speed of the driven member will vary between narrower limits than is the case of the transmission shown in Figure 8 having only two arms and two pins. More particularly, the driven element 127 of Figure 10 will have the same maximum speed as the driven element 55 of Figure 8. However, whereas the minimum speed of the driven element 55 of Figure 8 is approximately equal to that of the driving element, the minimum speed of the driven member 127 of Figure 9 will be substantially above the speed of the driving element. This follows from the fact that any given arm 121–124 drives the driven member only during the central 90° of the 180° cycle of Figure 12. The resultant speed ratio of driven element to driving element is illustrated in Figure 14.

Figure 14:
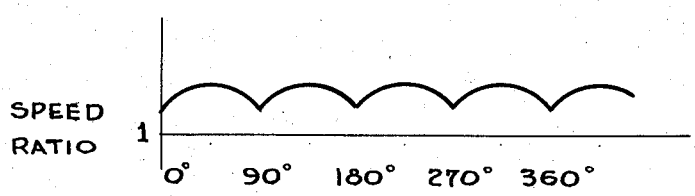
Fig. 14 is a diagram similar to Fig. 12 characteristic of the apparatus of Figs. 9 and 10.

Comparison of Figure 14 with Figure 12 reveals that the dips in the curve of Figure 12, which occur when the arms 61 and 62 of Figure 8 are near their horizontal positions, are replaced in Figure 14 by additional peaks, by virtue of the fact that additional arms 122 and 124 take over the load when the arms 121 and 123 are near their horizontal positions. Accordingly, the driven element has a higher average speed as well as a more uniform speed in the embodiment of Figures 9 and 10 as compared to the embodiment of Figure 8.

Figure 13:
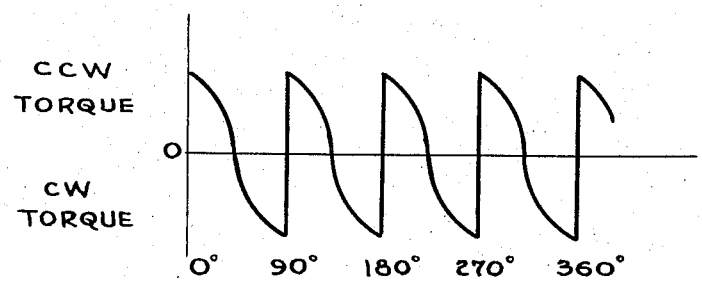
Fig. 13 is a diagram, similar to Fig. 11, characteristic of the apparatus of Figs. 9 and 10.

In addition, the torque applied to the arm 44 by the transmission of Figures 9 and 10 reaches smaller peak values since the arms 121–124 successively assume the load when they are at an angle of 45° with respect to the arm 44. This is indicated by the shape of the curve in Figure 13. Still further, in the embodiment of the invention illustrated in Figures 9 and 10, the torque on the arm 44 passes through zero during each 45° of revolution of the driven member 127 as is indicated by the curve of Figure 13. This provides more frequently recurring instants in which the control apparatus may be operated by a very small applied force.

It will readily be understood that the improved characteristics of the embodiment of the transmission illustrated in Figures 9 and 10 are obtained at the expense of a more costly construction since the required number of many of the operating parts is doubled. In the particular application of the invention illustrated in the drawings and described above the two-armed transmission of Figures 2, 3, 7 and 8 has been found satisfactory and is therefore preferred because of its lower cost. It will also be recognized that the variable speed transmission may employ three arms, or a number of arms in excess of four, all depending upon the performance desired in a given application.

There has now been described above and disclosed in the drawings a novel variable speed transmission having advantages not previously attained. Many applications of a variable speed transmission falling within the spirit of the invention will be obvious. Furthermore, two embodiments of this device have been disclosed, and it will be apparent that these disclosed embodiments may be modified very substantially without departing from the spirit of the invention.

Control apparatus for such a variable speed transmission has also been disclosed which allows adjustment of the transmission to vary the speed ratio thereof by a very small applied force. In the particular embodiments of the invention disclosed this results from the fact that one member of the transmission is pivotally mounted and has like gears 48 and 50 with a single or odd number of idler gears associated with the movable transmission member. With such an arrangement the torque on the pivotal mounting passes repeatedly through zero whereby certain of the control elements are idle or floating such that they may be moved by the application of a very small force. Still further, the control means as disclosed is irreversible whereby forces applied thereto by the transmission do not operate against the controlling force or element. In the control apparatus shown, a link is pivotally connected to the arm 41 through the integral extension thereof with the result that extended pivotal movement of the link may be accompanied by relatively small longitudinal movement thereof and relatively small pivotal movement of the arm 41. Various modifications will be obvious.

It is to be understood that the control apparatus described herein is applicable to variable speed transmissions of types entirely different than the preferred type disclosed. More specifically it can be used to advantage with any variable speed transmission which applies forces of alternating direction to a member through which its speed ratio is controlled. If a variable speed transmission has this one characteristic it is subject to control by the illustrated control apparatus in the manner described, that is, the ultimate directing device can operate the control means during recurring instants when there is substantially no resistance to the directing device, the control means, at all other times, containing the forces applied thereto by the transmission such that these forces are not felt by the directing device. Various types of transmissions, other than the type disclosed, and which have this characteristic, will be apparent or are known to those skilled in the art, and since these do not of themselves constitute a feature of the present invention they are not described herein.

The adjusting devices 75 and 83 for the control apparatus cooperate to provide adjustment of the control apparatus in a novel manner. In the specific embodiment illustrated the adjusting device 75 orients the cam track 73 at various angles to obtain differing amounts of longitudinal movement of the link 71 in response to a given angular movement thereof by the directing device, in this case the temperature responsive unit 90. The adjusting device 83 moves the cam track bodily to the left or right such that when the temperature responsive unit 90 is subjected to liquid at a selected standard temperature the cam follower 74 will be positioned at the pivotal axis of the cam track 73. More generally, regulation of the adjusting device 75 produces a family of curves for the control apparatus, each indicative of a different rate of response to the directing device, while regulation of the adjusting device 83 may provide that the common point of this family of curves corresponds to a standard condition, in this case a selected standard temperature.

Finally, a novel liquid volume flow metering machine has been disclosed which employs this variable speed transmission and control apparatus to compensate the register for the expansion or contraction of the liquid in response to temperature changes. The machine disclosed is readily adjustable to different temperature coefficients of expansion and responds quickly, sensitively and accurately to a wide range of temperatures. It is entirely mechanical in construction and is efficient and reliable in operation.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. Control means for varying the speed ratio of a variable speed transmission, said transmission being of the type in which forces transmitted thereby produce a counteracting force of alternating direction in a speed ratio control member therefor; said control means comprising cam means operatively connected to such speed ratio control member, said cam means being arranged to produce a relatively small movement of said control member in response to relatively large and generally perpendicular movement of said cam means, and detecting means responsive to changes in an external condition for causing such generally perpendicular movement of said cam means.

2. Control means for varying the speed ratio of a variable speed transmission, said transmission being of the type in which forces transmitted thereby produce a counteracting force of alternating direction in a speed ratio control member therefor; said control means comprising guide means, a control element movable under the guidance of said guide means and operatively connected to such speed ratio control member, said guide means permitting movement of said control element in one direction with a relatively small accompanying movement in a generally perpendicular direction to operate such speed ratio control member, and detecting means responsive to changes in an external condition for causing movement of said control element.

3. Control means for varying the speed ratio of a variable speed transmission, said transmission being of the type in which forces transmitted thereby produce a counteracting force of alternating direction in a speed ratio control member therefor; said control means comprising guide means, a link pivotally connected at one end to such control member and extending therefrom in a direction generally aligned with the direction of control movement thereof, guide follower means on said link operatively engaged with said guide means, said link being pivotable about said one end as said guide follower moves along said guide means, and detecting means responsive to an external condition for causing such pivotal movement of said link, said guide means being so oriented that such pivotal movement of said link is accompanied by a relatively small longitudinal movement thereof.

4. Control means for varying the speed ratio of a variable speed transmission, said transmission being of the type in which forces transmitted thereby produce a counteracting force of alternating direction in a speed ratio control member therefor; said control means comprising guide means, a link pivotally connected at one end to such control member and extending therefrom in a direction generally aligned with the direction of control movement thereof, guide follower means on said link operatively engaged with said guide means, said link being pivotable about said one end as said guide follower moves along said guide means, detecting means responsive to an external condition for causing such pivotal movement of said link, and means for adjusting the angular orientation of said guide means such that pivotal movement of said link is accompanied by relatively small longitudinal movement thereof which is a selectable function of said pivotal movement.

5. Control means for varying the speed ratio of a variable speed transmission, said transmission being of the type in which forces transmitted thereby produce a counteracting force of alternating direction in a speed ratio control member therefor; said control means comprising guide means, a link pivotally connected at one end to such control member and extending therefrom in a direction generally aligned with the direction of control movement thereof, guide follower means on said link operatively engaged with said guide means, said link being pivotable about said one end as said guide follower moves along said guide means, detecting means responsive to an external condition for causing such pivotal movement of said link, means for adjusting the angular orientation of said guide means such that pivotal movement of said link is accompanied by relatively small longitudinal movement thereof which is a selectable function of said pivotal movement, and means for displacing said guide means generally longitudinally of said link to vary the reference base of said function.

6. The control means of claim 1 including means for readily adjusting said cam means to alter the ratio of relative movement of said detecting means and said control member.

7. The control means of claim 1 including means for readily adjusting said cam means to alter the position of said control member for all positions of said detecting means.

8. The control means of claim 2 including means for readily adjusting said guide means to alter the ratio of relative movement of said control element and said control member.

9. The control means of claim 2 including means for readily adjusting said guide means to alter the position of said control member for all positions of said detecting means.

References Cited in the file of this patent

UNITED STATES PATENTS

| | | |
|---|---|---|
| 2,129,066 | McGogy | Sept. 6, 1938 |
| 2,191,766 | Marsh | Feb. 27, 1940 |
| 2,291,883 | Craig | Aug. 4, 1942 |
| 2,438,934 | Marsh | Apr. 6, 1948 |
| 2,438,935 | Marsh | Apr. 6, 1948 |

FOREIGN PATENTS

| | | |
|---|---|---|
| 450,545 | Italy | July 23, 1949 |